United States Patent [19]

Thellúfsen et al.

[11] 4,141,491

[45] Feb. 27, 1979

[54] TAPE PUNCHING DEVICE

[75] Inventors: Jørn Thellúfsen, Soborg; Niels E. M. Nielsen, Roskilde, both of Denmark

[73] Assignee: GNT Automatic A/S, Denmark

[21] Appl. No.: 858,424

[22] Filed: Dec. 6, 1977

[30] Foreign Application Priority Data

Oct. 3, 1977 [DK] Denmark ............................ 4368/77

[51] Int. Cl.² ........................................... G06K 1/10
[52] U.S. Cl. .................................... 234/115; 234/116; 234/129; 234/130
[58] Field of Search ................. 234/115, 116, 128–130

[56] References Cited

U.S. PATENT DOCUMENTS

3,964,673  6/1976  Cless et al. ........................... 234/115

Primary Examiner—J. M. Meister
Attorney, Agent, or Firm—Watson, Cole, Grindle & Watson

[57] ABSTRACT

In a tape punching device, punching needle selection takes place by means of selector strips slidably mounted in a rocking arm and engaged by armatures of selector magnets at their rear ends in the vicinity of the rocking axis of the rocking arm. The rocking arm and selector magnets are mounted in a separate case which is insertable in a main housing containing a continuously rotatable main shaft with an eccentric engageable by an open fork at the front end of the rocking arm. The main housing also contains a feeding mechanism alternatively usable for forward feed and back-space through 180° displacement of a pulse supplied to a feeding magnet.

19 Claims, 10 Drawing Figures

TAPE PUNCHING DEVICE

BACKGROUND OF THE INVENTION

This invention relates to a tape punching device, i.e., a device capable of punching holes over the width of a tape in a coded pattern in accordance with electrical data signals received from any suitable source of such signals, and of stepping the tape forwards in readiness for receiving and punching such successive signals which may be representative of characters or other symbols suitable for the communication of information.

More particularly, the invention relates to a punching device designed for high speed operation, i.e., a device capable of receiving and punching data signals in very rapid succession if and when signals are available in such rapid succession, e.g. from a data store of any type.

In high speed punching devices it is well known to provide some form of continuously running machinery comprising oscillating physical masses for supplying the whole of the punching energy, in combination with a system of selecting members for merely transferring the punching energy from the oscillating masses to a system of punching needles in accordance with the selection made for each individual data signal by means of selector magnets controlled by the data signals and setting the individual selecting members for "punch" or "do not punch". An example of a device of this type is known from U.S. Pat. No. 3,795,793. Another device of the same general type is marketed under the name of SOROBAN LP-2 PERFORATOR.

SUMMARY OF THE INVENTION

It is an object of the invention to provide a high-speed tape punching device of the general type referred to, in which the physical mass of the selecting members as well as their physical movement for setting and resetting are kept very low in the interest of reducing both inertia and energy requirements of the selecting operation, while at the same time supporting and guiding the selecting members in such a manner as to obtain a high structural stability of the system of selecting members as well as a high reliability of operation.

It is a further object of the invention to provide a high-speed tape punching device of a very compact construction and specially designed for keeping manufacturing costs low, particularly for easy and simple assembling, and also disassembling for the purpose of checking and substitution of parts or units.

A still further object of the invention is to provide a simple and reliable tape feeding mechanism using the same parts for forward feed and back-space simply by a phase displacement of the feeding signal.

According to a main feature of the invention, a tape punching device comprises a travel passage for a tape to be provided with signal holes, a punching tool having a row of holes across the travel passage corresponding to the maximum number of holes to be punched across the tape, a punching needle in each hole, a rocking arm mounted for rocking movement about a stationary axis at a distance from the row of punching needles, means for continuously causing said rocking arm to rock forth and back to perform alternate operative and return strokes, said rocking arm extending from said stationary axis to the vicinity of the rear ends of the punching needles, a number of selector strips corresponding to the number of punching needles being slidably mounted in the rocking arm, each selector strip having a free rear end adjacent the rocking axis of the rocking arm and a free front end adjacent the rear end of a corresponding one of the punching needles, a stationary selector magnet having an armature with a free end adapted to act on the free rear end of each selector strip to displace same from a retracted position in which its front end is retracted from a supporting edge formed adjacent the front end of the rocking arm and is not engageable with the rear end of the corresponding punching needle, to an advanced position in which its front end extends freely beyond said supporting edge behind the rear end of the corresponding punching needle and is engageable therewith by the operative stroke of the rocking arm to advance the respective punching needle to punch a hole in the tape, spring means for restoring any selector strip to its retracted position when no longer acted upon by the respective selector magnet, means on said rocking arm engageable during the return stroke thereof with shoulder faces of any and all punching needles that have been advanced during the preceding operative stroke, tape feeding means, and electronic means for producing signals suitable for controlling the admission of punching data to said selector magnets and the transmission of feeding pulses to said tape feeding means.

Further objects and features of the invention will be apparent to those skilled in the art from the following description of a preferred embodiment.

DESCRIPTION OF THE PREFERRED EMBODIMENT

Figure 1:
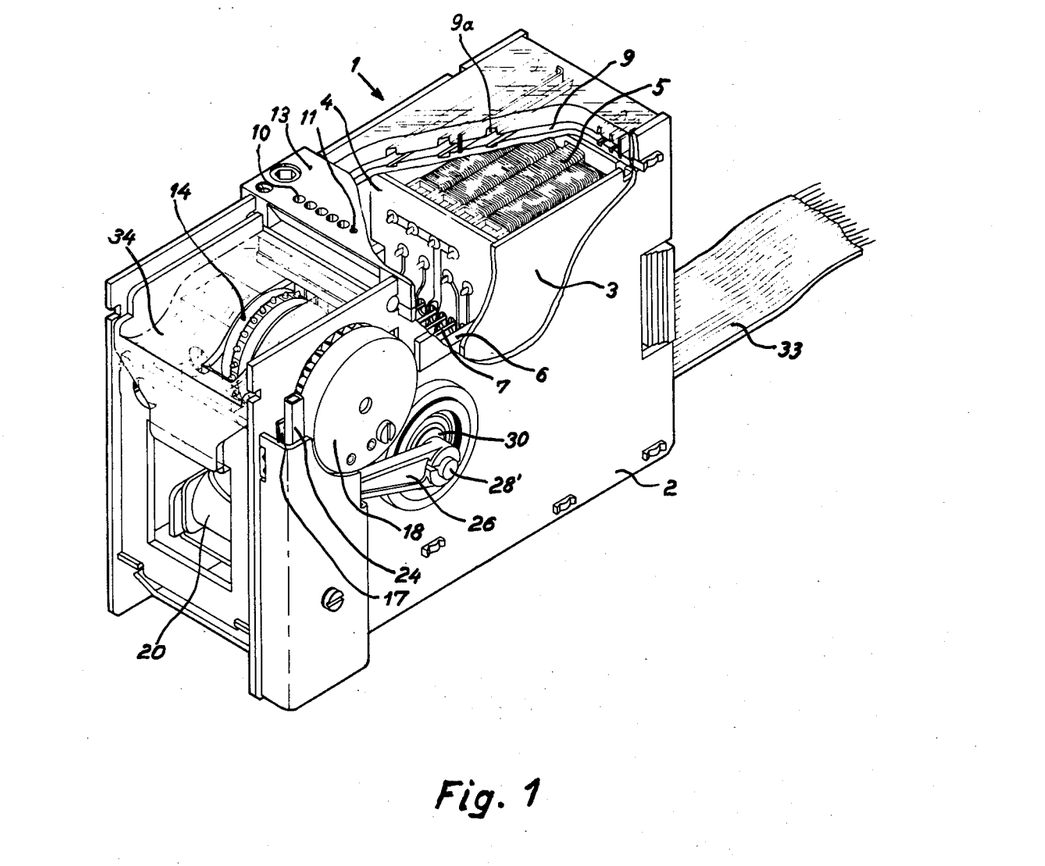
FIG. 1 is a general perspective view of a tape punching device in accordance with the preferred embodiment of the invention, with parts broken away.
Figure 3:
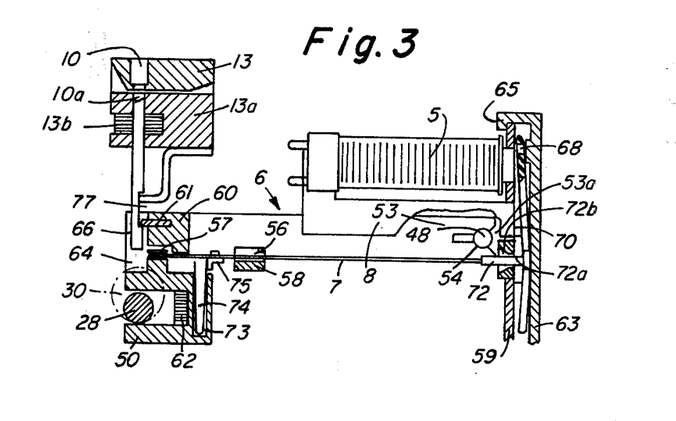
FIG. 3 is a longitudinal section through the punch selecting mechanism illustrated in FIG. 2, the section being taken along one of the selector strips of the mechanism, the selector strip being shown in its retracted position.
Figure 4:
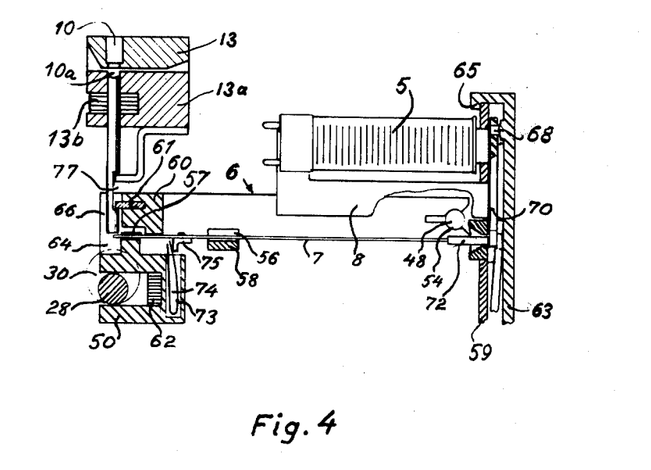
FIG. 4 is a section corresponding to FIG. 3, but with the selector strip in its advanced position.

FIG. 1 is a general view of a tape punching device, generally denoted by 1, illustrating the complete assembly of component units and parts to be described in further detail with reference to the following figures. The device has a main housing 2 and a case 3 forming a separate unit insertable in and withdrawable from the main housing 2. In FIG. 1, the housing 2 and the case 3 have been partly broken away in order to illustrate interior parts including a print plate 4, selector magnets 5, a rocking arm 6 and selector strips 7. The selector magnets 5 are electro-magnets having coils mounted on cores 8 which are seen in FIGS. 3 and 4. FIG. 1 also shows a travel passage 9 for a tape to be punched. In the embodiment illustrated top and bottom walls of the passage 9 are constructed with longitudinal grooves 9a into which bars may be pushed if it is desired to adapt the device for tapes of less than maximum width. The travel passage 9 is continued through a punching tool, the die block 13 of which is shown with a row of holes 10 extending crosswise of the travel passage in a pattern corresponding to the punching code and also including a smaller hole 11 corresponding to the location of a feeding hole in that pattern. The holes 10 and 11 are the outlets from the die block through which the paper chads emerge.

Figure 2:
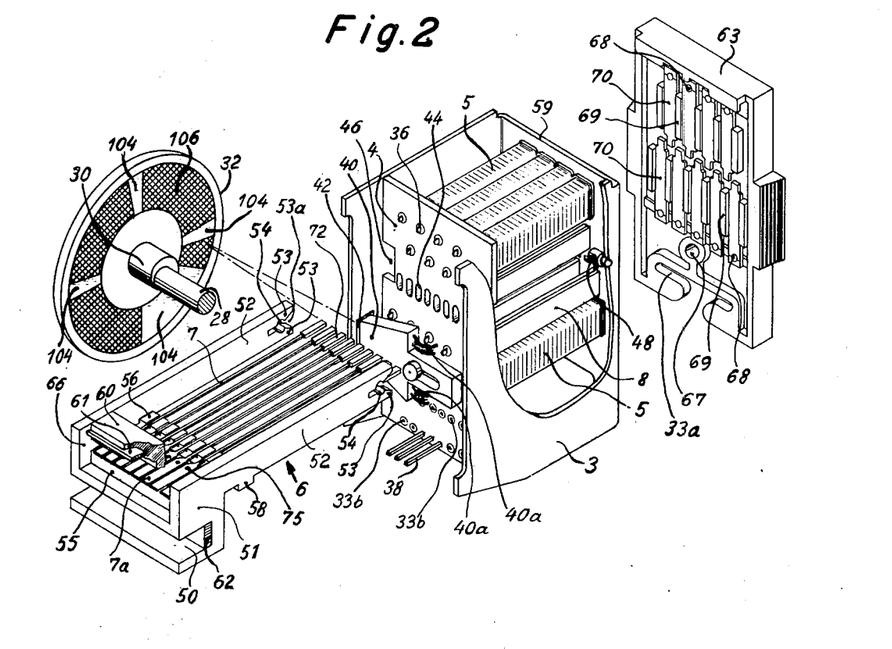
FIG. 2 is an exploded perspective view of a case insertable in the main housing of the device and parts associated with that case and constituting the punch selecting mechanism of the device, and also a detached view of the main shaft of the device and an eccentric and a pulley mounted thereon.
Figure 5:
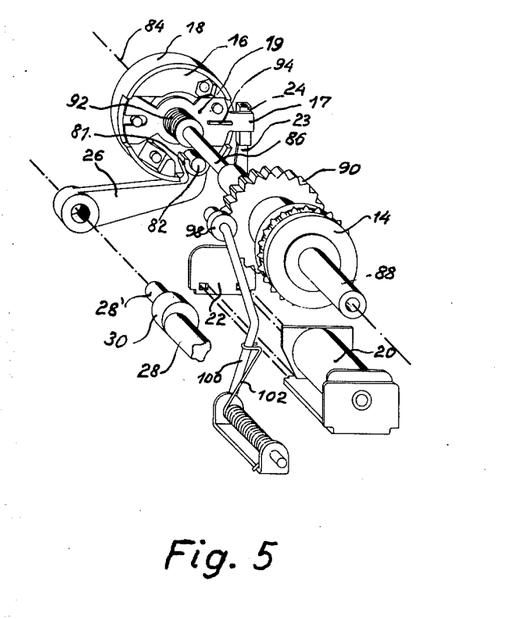
FIG. 5 is a perspective view of the tape feeding mechanism of the device as seen from the rear side of the device, referring to the illustration in FIG. 1.
Figure 6:
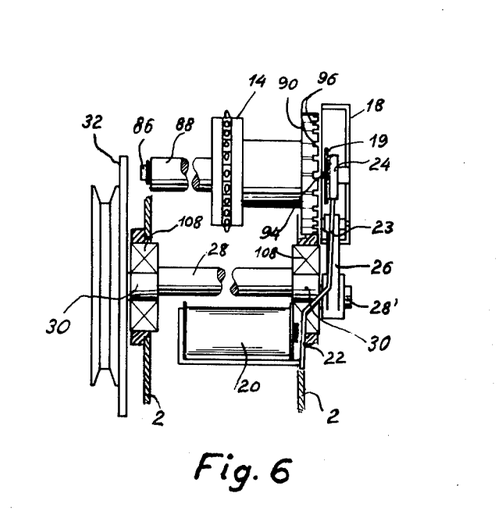
FIG. 6 shows the tape feeding mechanism of the device as seen from the front end of the device.
Figure 7:
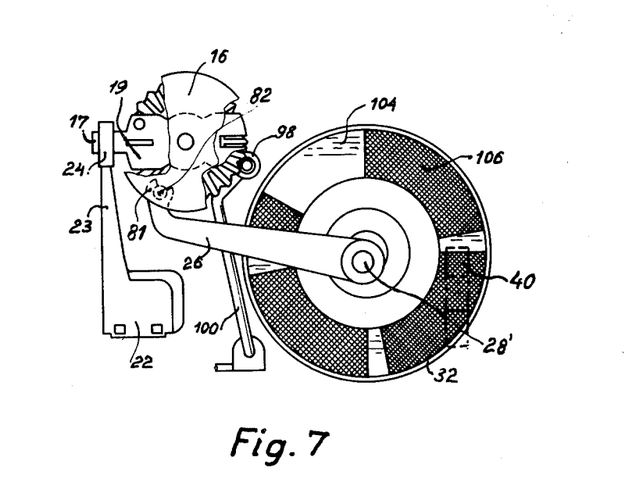
FIG. 7 shows the tape feeding mechanism of the device as seen perpendicularly to the front side of the device, referring to the illustration in FIG. 1, FIG. 7 also showing the pulley mounted on the main shaft of the device.

FIG. 1 also shows a sprocketed tape feeding wheel 14, a cover 18 for a transfer member 16, FIGS. 5 and 7, which is caused to oscillate by means of a connecting rod 26 connected to an eccentric 28' on a main shaft 30 driven by a pully 32, FIGS. 2, 6 and 7, as well as a feeding magnet 20 and the outer end 24 of an armature arm belonging thereto for engaging a lug 17 to transfer oscillating movement from the transfer member 16 to the feeding wheel 14 on the occurrence of a tape feed signal, as will be described below. The reference numeral 33 designates a flat multi-cable for connecting the circuitry of the device to a data source via interface circuitry in well-known manner. The reference numeral 34 signifies an transparent illustration a guide plate to guide the tape to the feeding wheel 14 so as to ensure proper engagement of the sprockets of the feeding wheel with the feeding holes of the tape. The arrangement is such that after each punching operation the tape will be fed one step of a predetermined length forward by the feeding wheel.

FIG. 2 is an exploded view of the separate unit comprising the case 3 and associated parts. Besides, FIG. 2 shows the main shaft 30 and the pulley 32 which do not belong to the separate unit, but are mounted in the main housing 2. These are shown with their axis in the position it will assume relative to the case 3 when all parts associated with the case 3 have been mounted and the case has been inserted into the main housing 2. As will be seen, the print plate 4 constitutes a transverse wall of the case 3 somewhat behind its front end. It is provided with printed circuitry diagrammatically indicated in FIG. 1, but not shown in FIG. 2, for establishing the required interconnections between the conductors of the cable 33, represented in FIG. 2 by spots 33b, supply conductors of the selector magnets 5, represented in FIG. 2 by spots 36, and supply conductors of the tape feeding magnet 20, represented in FIG. 2 by contact legs 38 engageable with corresponding sockets in the main housing 2. On the print plate 4 there is also mounted a reflex sensor 40, which is capable of emitting light through an opening 42 of one casing side wall and of receiving signals reflected back through the same opening. The components of the reflex sensor 40 are also connected to the circuitry of the print plate 4, as illustrated by conductors 40a, which comprise conductors for the current supply of the light source of the reflex sensor 40.

The rocking arm 6 comprises a head 51 and two side arms 52. In the head there is formed an open fork 50 which, on insertion of the case 3 into the main housing 2, is freely engageable with an eccentric 28 on the main shaft 30 and is likewise freely withdrawable therefrom to permit extraction of the case 3. The engagement of the fork 50 with the eccentric 28 is illustrated in FIGS. 3 and 4. It will be seen in these figures that the eccentric 28 is in its lowermost position, and the figures therefore represent the rocking arm 6 in its lowermost position. For simplicity of illustration, this position is shown as being its horizontal position. While this is a perfectly practicable arrangement, it is preferable in practice to make the arrangement such that the horizontal position of the rocking arm 6 is its medium position, in which case the rocking arm would be slightly inclined downwards to the left in FIGS. 3 and 4. Preferably the rocking arm is made from a material, e.g. a polyacetal, having a wear resistance so high and a coefficient of friction so low that no lubrication is required between the fork 50 and the eccentric 28, the latter consisting e.g. of steel or other suitable metal. However, to still further reduce wear and friction, a pad 62 of semi-permanent lubricating felt may be arranged at the bottom of the fork 50.

At their ends remote from the head 51, the side arms 52 are constructed with longitudinal cuts to form tongues 53 having opposed semi-cylindrical bearing surfaces 54 for resiliently engaging pivots 48 mounted interiorly on the side walls of the case 3 adjacent its rear end, the cuts being provided with widening mouth portions 53a to facilitate the operation of engaging the bearing surfaces 54 with the pivots 48 to establish the pivotable mounting of the rocking arm 6.

The selector strips 7 are slidably mounted in guiding grooves 56 of a transverse bracing member 58 connecting the side arms 52 and in guiding grooves 57 of a sill 55 formed in the head 51, and besides are supported from above by an upper cross beam 60 slightly behind the sill 55. The selector strips 7 are constructed with widened end portions 7a for engaging the punching needles 12 and for support against the sill 55 and the upper cross beam 60. From the guiding grooves 56 the selector strips extend freely along the length of and slightly beyond the side arms 52 and are provided at their free ends with shoes 72, e.g. of polyacetal.

Figure 4A:
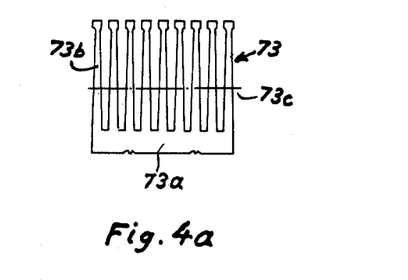
FIG. 4a a blank for making a restoring spring for the selector strips.

Below the level of the selector strips 7 there is provided in the head 51 a recess 74, in which a spring 73 in the form of a comb bent in V-shape is loosely fitted. A blank, from which the spring 73 is made, is shown in FIG. 4a. It has a base portion 73a from which a number of teeth 73b, one for each selector strip 7, extend. The blank is bent in a rounded bending along a line 73c to provide the V-shape having a shorter leg supported against the front wall of the recess and a longer leg, the teeth of which individually engage noses 75 attached to the selector strips 7 in the widened end portions 7a thereof. Thus, the spring 73 forms a restoring spring common to all the selector strips 7, but acting individually on these, tending to keep them in a retracted position illustrated in FIG. 3, in which their front ends are practically in line with the front edge of the sill 55.

The selector magnets 5 are mounted between the print plate 4 and a rear wall 59 of the case 3, the cores of the selector magnets having their free ends embedded in the rear wall 59 and having their pole faces located in the rear surface of the rear wall 59. The selector magnets belonging to successive selector strips 7 are mounted alternately above and below the rocking arm and, as will be seen, all extend along part of the length of the rocking arm, whereby a very compact construction is obtained. The armatures 70 of the selector magents are mounted on the inner face of a cover plate 63 which is attachable to the rear end of the case 3 by means of a nose 65 engaging the upper edge of the rear wall 59 of the case and a single screw extending through a screw hole 67 of the cover plate 63. The armatures 70 are loosely mounted on pins 68 projecting from the rear wall of the cover 63 and are guided in recesses between ribs 69 likewise projecting from the rear wall of the cover 63. The arrangement is such that when the cover plate 63 is attached to the case 3, the end of each armature supported by the pin 68 is held in close proximity to one pole face of the respective selector magnet, while the other end of the armature is free to play between the rear wall 59 of the case 3 and the rear wall of the cover plate 63. In the area of the latter end of each armature the rear wall 59 is fitted with a guide passage 72a with a widening mouth portion 72b for the shoe 72 of the respective selector strip 7. The shoes 72 and the guide passages are made from materials suitable for minimizing friction and wear. Thus, the shoes may be made from polyacetal, and the guide passages from polycarbonate.

The print plate 4 is provided with openings 46 for the passage of the side arms 52 of the rocking arm 6 and openings 44 for the passage of the selector strips 7. The openings 46 and 44 have a size sufficient for permitting the required movements of the side arms 52 and the selector strips 7 respectively. Thus, it will be realized that when the restoring spring 73 has been fitted in the recess 74 and the selector strips 7 have been placed in their guiding grooves 56 and 57, thereby at the same time holding the spring 73 in place, the structure comprising these parts can be pushed through the print plate 4 into the case 3 to engage the bearing surfaces 54 with the pivots 48 and simultaneously to engage the shoes 72 of the selector strips 7 in the guide passages 72a fitted in the rear wall 59. Thus, the rocking arm with all the parts carried thereby may be mounted in the case 3 just by a pushing movement without the use of any tools, and may likewise be extracted from the case 3 as a constructional unit. Since the guide passages 72a are located in close proximity to the rocking axis formed by the pivots 48 it will be realized that rocking of the rocking arm 6 will practically not produce any relative movement of the selector strips 7 and the rocking arm 6 so that the selector strips will lie loosely in their guiding grooves 56 and 57 in all positions of the rocking arm 6.

FIG. 3 illustrates the situation where a selector magnet 5 is not energized. Consequently, the restoring spring 73 tends to keep the respective selector strip in its retracted position in which, as previously mentioned, its front end is practically flush with the front edge of the sill 55, while its rear end projects through its guide passage in the rear wall 59 to keep the free end of the armature 70, with which is cooperates, in its non-attracted position.

In the head 51 there is provided, in front of the sill 55 and the upper beam 60, an open space 64 in which punching needles 12 depend from the punching tool which, in addition to the die block 13 mentioned with reference to FIG. 1 and also illustrated in FIGS. 3 and 4, comprises a needle guide block 13a with a needle guide 10a flush with each hole 10 of the die block 13.

The needle guide block 13a is provided with a transverse recess in which a pad 13b of lubricating felt is mounted. The open space 64 is flanked by guiding surfaces 66 engaging the two outermost punching needles 12 from the side so as to obtain correct lateral guiding of the rocking arm 6. The upper beam 60 is provided with a dog plate 61 extending into the open space 64 to engage a recess 77 of each punching needle.

When the selector magnet 5 attracts its armature 70, the free end of the armature will act on the shoe 72 forming the rear end of the respective selector strip 7 and will thereby tend to displace the selector strip 7 against the action of the restoring spring 73 to make its front end project freely beyond the front edge of the sill 55. Such displacement will take place if the rocking arm 6 is in its lowermost position or at least arrives in this position while the selector magnet 5 is being energized. The front end of the selector strip thereby gets under the respective punching needle 12 as illustrated in FIG. 4 and during the subsequent upward stroke of the rocking arm caused by the engagement of the eccentric 28 with the fork 50 the punching needle will therefore be pushed upwards to punch a hole in a tape present between the die block 13 and the needle guide block 13a. During the subsequent downward stroke of the rocking arm 6 the punching needle 12 will be retracted by the dog plate 61 engaging the lower edge of the recess 77. The height of the recess 77 is such that if a selector magnet 5 is not energized and the respective selector strip therefore remains in its retracted position, the dog plate 61 can move freely along the length of the recess 77 during the upward stroke of the rocking arm 6 without striking the upper edge of the recess 77.

It will be realized that the whole force for the punching operation is delivered by the main shaft 30 and its eccentric 28 through the rocking arm 6 and is transferred to the punching needles 12 through a very short extending length of the selector strip 7, which is supported both from below and from above immediately adjacent its place of engagement with the punching needle, so that the selector strip will be subjected to a minimum of bending stress which is limited to a short widened end portion. The selector strip may therefore be made extremely thin. As an example, the set of selector strips may be chemically milled from a sheet of hardened steel or similar hard metal having a thickness of the order of 0.3 mm, the strips having a width of the order of 0.8 mm over the major part of their length and a width of the order of 2.0 mm over the length of the widened front end portions. Thus, over the major part of their length, the selector strips will have a cross sectional area of only 0.25 mm$^2$. Moreover, since the small displacement of these thin selector strips 7 is the only work to be performed by the selector magnets 5 the energy requirements of the selector magnets will be low which is a further factor promoting a compact and inexpensive construction. Thus, in the embodiment illustrated it has been found sufficient to mount a coil on one leg only of each selector magnet. Also, both the mechanical inertia and the electric inertia, the latter represented mainly by the inductance of the selector magnet coils, may be kept at a minimum, thereby ensuring a very quick response of the punching mechanism to data signals.

In spite of the extreme slimness of the selector strips 7, these form a component of high structural and functional stability, because they lie well protected in the device and are so well guided in all points of co-operation with other elements as to ensure proper co-operation without any check or adjustment.

FIGS. 5, 6 and 7 illustrate the feeding mechanism which is to be activated every time a pattern of holes representing a signal, such as a character, has been punched in the tape during the up-stroke of the rocking arm, but not when the rocking arm has performed an idle up-stroke. These figures show in more detail some parts already mentioned with reference to FIG. 1, viz. the sprocketed feeding wheel 14 which is driven by the transfer member 16 located within the cover 18 via the connecting rod 26, the eccentric 28' and the main shaft 30 under the control of the feeding magnet 20.

One end of the connecting rod 26 is rotatably connected with the main shaft eccentric 28', while its other end is formed as a fork 81 resiliently embracing a drive pin 82 on the transfer member 16, whereby the connecting rod 26 causes the transfer member 16 to perform an oscillating movement about its axis which coincides with the axis 84 of the feeding wheel 14. In FIG. 5, the parts of the mechanism have been pulled apart in order to illustrate the manner in which the mechanism is assembled. The transfer member 16 is fixed to a shaft 86 which is rotatably and slidably mounted in a tubular shaft 88 which is common to the feeding wheel 14 and a so-called jockey wheel 90 associated therewith. A transfer tilting plate 19 is mounted in the transfer member 16 so as to be non-rotatable relative to the transfer member, but being tiltable out of the plane of the transfer member against the action of a restoring spring 92. The tilting plate 19 carriers a cam 94 directed towards the jockey wheel 90 and also carries the lug 17 mentioned with reference to FIG. 1, which lug 17 extends out of the cover 18 and can be engaged by the end portion 24 of the armature 22 of the feeding magnet 20. The said end portion 24 of the armature arm 23 has a sufficient extension to be capable of pressing the tilting plate 19 out of its position of rest in all angular positions of the transfer member 16 produced by the connecting rod 26. The angle through which the transfer member 16 oscillates forth and back corresponds to the pitch of the teeth of the jockey wheel 90 which is equal to the pitch of the sprockets of the feeding wheel 14.

When the tilting plate 19 is tilted by the feeding magnet armature 22 it is engaged with a corresponding one of a system of grooves 96 in the side of the jockey wheel 90 facing the transfer member 16, whereby the jockey wheel is rotated as long as the armature 22 is being attracted by the feeding magnet 20. A jockey roller 98 mounted on a jockey roller arm 100 engages the jockey wheel 90 under the influence of a biasing spring 102 acting on the jockey arm 100 to ensure accurate spacing in well-known manner. As will be seen, the whole feeding mechanism contains no parts depending on the direction of oscillation of the transfer member 16, and the mechanism may therefore be used just as well for backspace as for forward feed motion, depending on the timing of the feeding pulses transmitted to the tape feeding magnet 20. It will also be realized that there is a considerable allowance for the early transmission of energizing pulses to the feeding magnet 20 (to make up for electrical and mechanical inertia), because if the tilting plate 19 is tilted towards the jockey wheel 90 while the transfer member 16 is yet oscillating in the wrong direction, the cam 94 will ride on the tooth between two grooves 96 and will snap into one of these grooves only at the time or reversal of the oscillating movement of the transfer member 16, the correct spacing and the maintenance of the feeding wheel in position between successive steps always being ensured by the engagement of the jockey roller 98 with the teeth of the jockey wheel 90.

FIG. 6 illustrates the main shaft 30 as being mounted in two roller bearings 108. FIG. 6 also illustrates the relative axial locations of the eccentric 28 for the punching operation and the eccentric 28' for the feeding operation. Moreover, FIG. 6 shows the true position of the pulley 32 previously referred to with reference to FIG. 2. The true position of the pulley 32 is also shown in FIG. 7 where moreover the location of the reflex sensor 40 is indicated in dot-dash lines.

As illustrated in FIGS. 2 and 6, the surface of the pulley 32 facing the reflex sensor has angularly alternating reflecting areas 104 and "non-reflecting" areas 106. When a reflecting area 104 passes in front of the reflex sensor 40, the light emitted by the reflex sensor is reflected towards the reflex sensor to produce a signal therein. When a "non-reflecting" area 106 passes in front of the reflex sensor 40 there will not be a sufficient reflection of light to cause the reflex sensor to respond. This should be taken as a definition of the terms "reflecting" and "non-reflecting" areas.

The reflex sensor 40 is connected via the print plate 4 and conductors of the cable 33 to interface circuitry controlling the transmission of signals to the device from a data source. The interface circuitry does not form part of the invention, and for completeness one way of correlating such circuitry with the functions of the device will be explained with reference to graphs in FIGS. 8 and 9.

Figure 8:
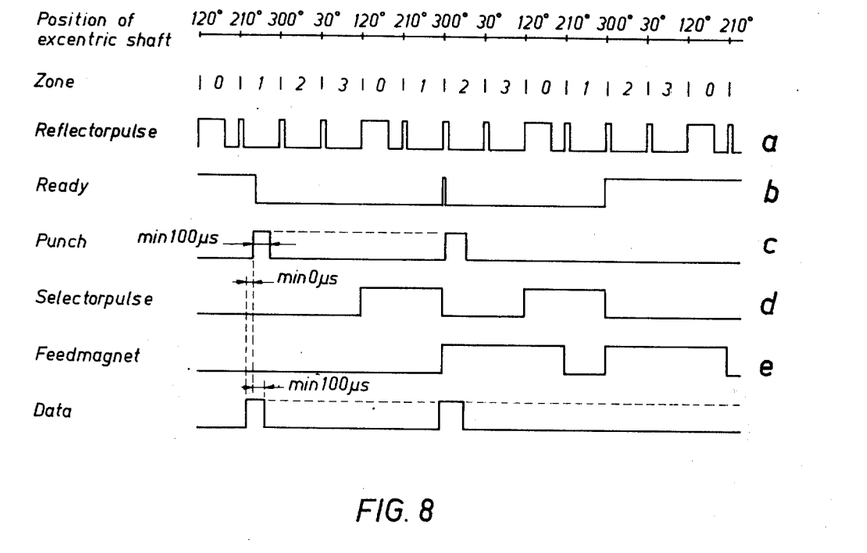
FIG. 8 shows graphs illustrating the electronic control of the device, as applied to the punch and forward feed sequences.
Figure 9:
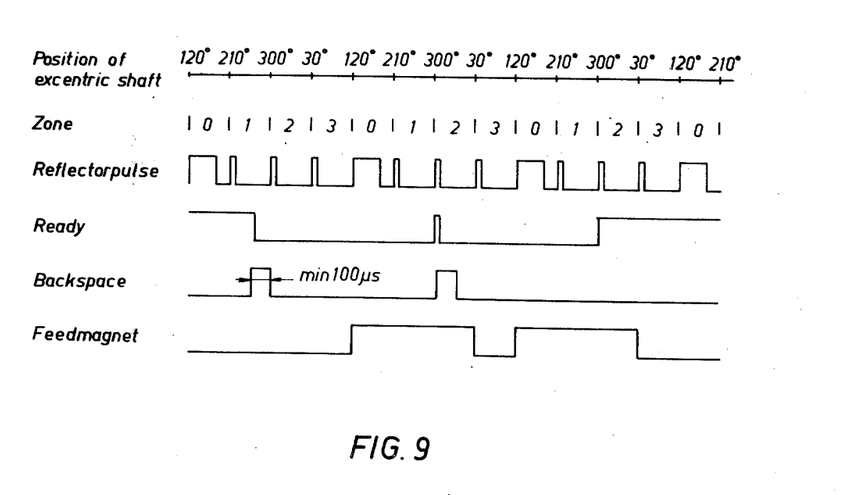
FIG. 9 shows graphs illustrating the electronic control of the device, as applied to the back-space sequence.

In these graphs, the signals are plotted against mechanical angle which means the angular position of the main shaft. Mechanical angle 0° (360°) should be understood as representing the top position of the eccentric 28 and thereby of the rocking arm 6. Thus, the operative stroke of the rocking arm 6 is from 0° to 180° and the return stroke from 180° to 0°.

If all mechanical movements were instantaneous upon initiation of a control signal, then the correct time for transmitting energizing signals to the selector magnets would be mechanical angle 180° and the correct time for transmitting de-energizing signals to the selector magnets would be mechanical angle 0°. However, owing to electrical and mechanical inertia there will be a phase displacement before the mechanical action instructed by a signal has been completed. If it is assumed that in a particular punching device this phase angle is 60°, the signals for energizing and de-energizing the selector magnets should be transmitted at mechanical angle 120° and 300° respectively. Moreover, it is assumed that the oscillating movement of the transfer member 16 is so synchronized with the main shaft that forward feeding signals should be transmitted between mechanical angles 300° and 210°.

In the example illustrated, the reflector disc represented by the surface of the pulley 32 has four reflecting segments, one of the size 60° and three of the size 10°. The segments are so placed that they subdivide the disc and thereby the mechanical movement into four equal zones each of 90°, the leading edge of the reflecting segments, as electronically detected, representing the transition between the respective zones.

In the electronic circuitry these zones are represented by the counts 0, 1, 2 and 3 (in binary form), the transition to zone 0 from zone 3 taking place at the leading edge of the wide reflecting segment and the transition to the following zones taking place at the leading edges of the successive narrow segments. When the motor is started, a detection of pulse length can thus synchronize the mechanical movement and the electronic counter, a re-setting pulse being supplied to the counter after a pulse time from the reflex sensor which at full speed of the main shaft corresponds to about 50° reflecting segment. When the synchronization has been effected, the counter is re-set to 0 at the leading edge of the wide segment. The reflecting disc is so placed that the 0-sector begins at 120° after the top position of the eccentric 28 and consequently the shift to the following zones takes place at 210°, 300° and 30°.

As explained above, it is assumed that for correct selection of the punching needles the respective selector magnets are energized between 120° and 300°, i.e., in the zones 0 and 1. Moreover, for correct forward feeding the feeding magnet must be energized between 300° and 210°, i.e., in the zones 2, 3 and 0.

Since forward feeding is to take place after each punching of a signal a selecting pulse in the zones 0 and 1 should always be succeeded by a feeding pulse in the zones 2, 3 and 0.

It is a special advantage of the punching device according to the invention that since the feeding movement is derived from a transfer member oscillating forth and back, back-space may be effected by the same mechanical equipment and the same feeding magnet as forward feed instead of using separate mechanisms for forward feed and back-space, such as is usual in conventional punching devices. All that is required in the punching device according to the invention is to energize the feeding magnet at a phase displacement of 180° in relation to forward feed. Thus, the back-space pulse should occur in the zones 0, 1 and 2.

For controlling the pulses, the control signals "punch" and "back-space" are supplied from the data source along with a number of data signals corresponding to the punching code pattern.

In FIG. 8, graph a represents the pulses received by the reflex sensor as previously explained. Graph b represents a "Ready" signal which is produced by the electronic circuit to indicate (when the signal is high) that the punching device is ready to receive and process data and control signals from the data source.

In FIG. 8, two punching operations with subsequent forward feed operations are illustrated. The first punch pulse, cf. graph c, is received at an "odd" time after the Ready signal has been high for some time. The leading edge of the punch pulse re-sets Ready and reads the data signal into a one character buffer store, to be utilized only during selection, i.e., in the zones 0 and 1.

It is a condition that the data signal arrives at the latest simultaneously with the pulse signal and is maintained for at least 100 s after the start of the punch signal. After reception of a punch pulse, the next following transition between zone 3 and 0 effects the selection and foward feed cycles above described in the zones 0, 1, cf. graph d, and 2, 3 and 9, cf. graph e, respectively.

In the middle of this selection and forward feed cycle, viz. at the termination of the selecting pulse, Ready is again set high. In the example illustrated this results in the immediate admission of a new punch pulse which again re-sets Ready. Since internally in the interphase electronic the punch signal is gated by Ready, the punch signal could have been continuous as indicated by a dotted line. The data signal can likewise be maintained, only shift to the next character must take place at the latest simultaneously with the punch signal (Ready signal, if punch is continuously high).

FIG. 9 illustrates the back-space situation. This corresponds in principle to the punch operation, only in the example illustrated back-spacing with continuous control signal is not possible. The pulse to the feeding magnet is displaced 180° relative to the forward feed pulse. A selector pulse is of course not relevant and no data signal is clocked into the buffer store.

It will be understood that the reflex sensor 40 can be replaced by any other well known means for producing cyclical electric signals having a cycle corresponding to one revolution of the main shaft, such as a photo sensor responsive to signals produced by an external light source, or magnetic pick-up means, and that also the logic circuitry explained can be modified in many ways according to the needs in each individual case.

We claim:

1. A tape punching device comprising a travel passage for a tape to be provided with signal holes, a punching tool having a row of needle guides across the travel passage corresponding to the maximum number of holes to be punched across the tape, a punching needle in each needle guide, a rocking arm mounted for rocking movement about a stationary axis at a distance from the row of punching needles, means for continuously causing said rocking arm to rock forth and back to perform alternate operative and return strokes, said rocking arm extending from said stationary axis to the vicinity of the rear ends of the punching needles, a number of selector strips corresponding to the number of punching needles being slidably mounted in the rocking arm, each selector strip having a free rear end adjacent the rocking axis of the rocking arm and a free front end adjacent the rear end of a corresponding one of the punching needles, a stationary selector magnet having an armature with a free end adapted to act on the free rear end of each selector strip to displace same from a retracted position in which its front end is retracted from a supporting edge formed adjacent the front end of the rocking arm and is not engageable with the rear end of the corresponding punching needle, to an advanced position in which its front end extends freely beyond said supporting edge behind the rear end of the corresponding punching needle and is engageable therewith by the operative stroke of the rocking arm to advance the respective punching needle to punch a hole in the tape, restoring spring means for restoring any selector strip to its retracted position when no longer acted upon by the armature of the respective selector magnet, means on said rocking arm engageable during the return stroke thereof with shoulder faces of any and all punching needles that have been advanced during the preceding operative stroke, tape feeding means, and electronic means for producing signals suitable for controlling the admission of punching data to said selector magnets and the transmission of feeding pulses to said tape feeding means.

2. A tape punching device as in claim 1, in which said restoring spring means consists of a comb spring bent in V-shape and loosely fitted in a recess of said rocking arm in a position to engage noses attached to said selector strips individually by its teeth.

3. A tape punching device as in claim 1, in which said selector strips are constructed with widened portions at their front ends for engaging the punching needles and for being supported in the rocking arm from both sides thereof immediately adjacent said supporting edge.

4. A tape punching device as in claim 3, in which said rocking arm is constructed adjacent its front end with a sill for supporting the widened front end portions of said selector strips from the side remote from the punching tool, said sill forming said supporting edge beyond which the front ends of the selector strips extend in the advanced position of the strips, said rocking arm further being constructed adjacent its front end with an upper beam for supporting said widened front end portions of the selector strips from the other side thereof.

5. A tape punching device as in claim 1, in which said selector strips consist of hardened steel or similar hard metal and over the major part of their length have a cross section of the order of 0.25 mm$^2$.

6. A tape punching device as in claims 3 and 5, in which the set of selector strips is chemically milled from a sheet of hardened steel or similar hard metal having a thickness of the order of 0.3 mm, the strips having a width of the order of 0.8 mm over the major part of their length and a width of the order of 2.0 mm over the length of the widened front end portions.

7. A tape punching device as in claim 1, in which said selector strips are supported in at least one set of longitudinal guiding grooves near the front end of said rocking arm and extend freely over the major part of the length of the guiding arm and are guided at their rear ends in stationary guide passages located in the vicinity of the rocking axis and directly in front of the free ends of the armatures of the respective selector magnets.

8. A tape punching device as in claim 6, in which the selector strips are provided at their rear ends with shoes for sliding in said stationary guide passages and for engagement by said free armature ends.

9. A tape punching device as in claim 1, in which said rocking arm is constructed with lateral guiding surfaces for engagement with the lower end portions of the two outermost punching needles.

10. A tape punching device as in claim 1, in which said rocking arm is constructed at its front end with a head formed with an open fork engageable with an eccentric on a continuously rotatable shaft to form said means for continuously causing said rocking arm to rock forth and back, said open fork being located on the side of said selector strips remote from said punching tool, said rocking arm with its selector strips being mounted in a case together with said selector magnets, the latter having their pole faces located in a common plane at the rear end of the case, said selector magnets having coils directly connected to circuitry of a print plate mounted in the interior of the case, the armatures of said selector magnets being mounted on a cover plate attachable to the rear end of said case, the case with the cover plate attached thereto and the rocking arm with its selector strips mounted therein forming a structural unit insertable in and withdrawable from a main housing of the device in which said continuously rotatable shaft and said tape feeding means are mounted.

11. A tape punching device as in claim 10, in which the selector magnets corresponding to transversely successive selector strips are mounted alternatingly on one and the other side of the over-all plane of said rocking arm, all selector magnets extending along part of the length of the rocking arm.

12. A tape punching device as in claim 10, in which said print plate is mounted transversely of said rocking arm in a position intermediate of its length and is constructed with holes for the passage of the rocking arm and the selector strips, said holes having a sufficient size to permit the required movements of these parts.

13. A tape punching device as in claim 10, in which said case is constructed with a rear wall, said selector magnets having cores the pole end portions of which are embedded in the material of said rear wall with their pole faces flush with the rear side of the rear wall.

14. A tape punching device as in claim 10, in which said case is constructed with side walls and a rear wall, said side walls carrying pivots for the mounting of said rocking arm, the latter being constructed with side arms extending rearwards from said head, each side arm being constructed at its rear end with tongues with bearing surfaces for resiliently clamping against the respective one of said pivots from opposite sides, thereby to establish mounting of the rocking arm on said pivots, said rear wall being fitted with guide passages in which the rear ends of the selector strips are freely slidably mounted, the selector strips extending freely between said side arms over the major part of the length of said rocking arm and being slidably supported and guided by said rocking arm adjacent the front end thereof, said rocking arm with said selector strips in position thereon being thereby insertable into said case to engage said tongues with said pivots and to introduce the rear ends of said selector strips into said guide passages, and being again withdrawable as a constructional unit from said case.

15. A tape punching device as in claim 14, in which said guiding passages are constructed with widened mouths for receiving the approaching ends of the selector strips.

16. A tape punching device as in claim 1, wherein said means for causing said rocking arm to rock forth and back comprises a continuously rotatable main shaft, and wherein said tape feeding means comprises a feeding wheel, a transfer member mounted co-axially with said feeding wheel and performing an oscillating movement about its axis alternately in the forward feed and back-space direction of said feeding wheel in synchronism with the rotation of the main shaft, and electro-magnetically operated coupling means for coupling said feeding wheel to said oscillating transfer member on the occurrence of a feeding signal, and wherein said electronic means comprises means associated with said main shaft for producing cyclical signals, the cycle of which corresponds to one revolution of the main shaft, and which signals are suitable for controlling the admission of punching data to said selector magnets during part of a revolution of said main shaft, followed by the transmission of a feeding signal to said electro-magnetically operated coupling means during another part of a revolution of said main shaft where said transfer member is moving in the forward feed direction.

17. A tape punching device as in claim 16, in which said cyclical signals are suitable for alternatively, on the occurrence of a back-space command signal, to control the transmission of a feeding signal to said electro-magnetically operated coupling means during part of a revolution of the main shaft where said transfer member is moving in the back-space direction.

18. A tape punching device as in claim 16, in which said cyclical signal producing means comprises a surface rotating synchronously with said main shaft and provided with angularly alternating reflecting and non-reflecting areas, and a stationary reflex sensor emitting light towards said surface and sensing light reflected from the reflecting areas thereof.

19. A tape punching device as in claim 18, in which said surface is provided with four reflecting areas, the leading edges of which are substantially 90° displaced from one another, one of said areas having a greater angular extension than the others.

* * * * *